US011904596B2

(12) United States Patent
Gentil

(10) Patent No.: US 11,904,596 B2
(45) Date of Patent: Feb. 20, 2024

(54) HOT FOIL STAMPING PRESS WITH A FLOW GUIDING ELEMENT

(71) Applicant: BOBST MEX SA, Mex (CH)

(72) Inventor: David Gentil, L'Auberson (CH)

(73) Assignee: BOBST MEX SA, Mex (CH)

( * ) Notice: Subject to any disclaimer, the term of this patent is extended or adjusted under 35 U.S.C. 154(b) by 68 days.

(21) Appl. No.: 17/593,639

(22) PCT Filed: Mar. 24, 2020

(86) PCT No.: PCT/EP2020/025142
§ 371 (c)(1),
(2) Date: Sep. 22, 2021

(87) PCT Pub. No.: WO2020/200518
PCT Pub. Date: Oct. 8, 2020

(65) Prior Publication Data

US 2022/0194072 A1 Jun. 23, 2022

(30) Foreign Application Priority Data

Apr. 5, 2019 (EP) .................................... 19020262

(51) Int. Cl.
*B41F 16/00* (2006.01)

(52) U.S. Cl.
CPC ........ *B41F 16/006* (2013.01); *B41F 16/0046* (2013.01)

(58) Field of Classification Search
CPC ................ B41F 16/006; B41F 16/0046; B41F 16/0093; B41F 1/38; B41F 1/32;
(Continued)

(56) References Cited

U.S. PATENT DOCUMENTS 8,881,649 B2 * 11/2014 De Gaillande ........... B41F 1/30 101/27
2003/0107167 A1 * 6/2003 Oetlinger ............. B65H 29/044 271/204

(Continued)

FOREIGN PATENT DOCUMENTS

CN 102390169 A 3/2012
CN 104370129 A 2/2015

(Continued)

OTHER PUBLICATIONS

International Search Report dated Apr. 24, 2020 in corresponding International Application No. PCT/EP2020/025142 (3 pages).

*Primary Examiner* — Jennifer Bahls
*Assistant Examiner* — Quang X Nguyen
(74) *Attorney, Agent, or Firm* — Bookoff McAndrews, PLLC

(57) ABSTRACT

A hot foil stamping press has a pressing system for pressing a foil onto a sheet, a blow unit which is positioned at a distance to the pressing system for directing a stream of gas between the sheet and the foil. The stream of gas to detaches the foil from the sheet after each stamping cycle. A gripper bar is arranged between the blow unit and the pressing system for gripping the sheet. A flow guiding element is arranged between the blow unit and the pressing system, preferably on the gripper bar, for directing the gas from the blow unit between the sheet and the foil. Said element avoids the losses in the stream of gas due to the aperture that exist between the grippers in a typical gripper bar.

20 Claims, 2 Drawing Sheets

Figure 1:
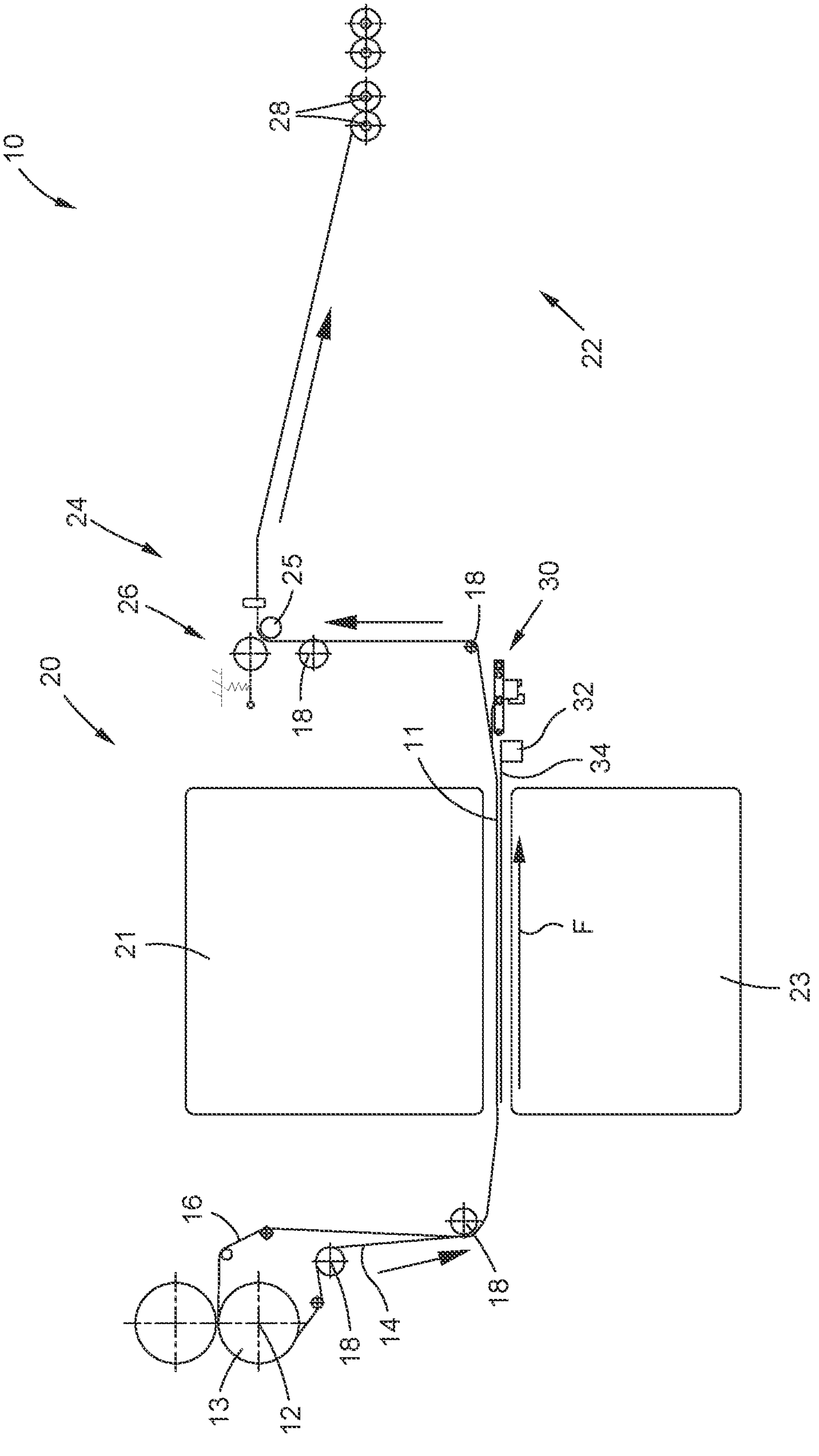

(58) Field of Classification Search
CPC .. B41F 1/44; B65H 5/085; B65H 5/14; B65H 29/003; B65H 29/02; B65H 29/045; B65H 29/047; B65H 2301/44338; B65H 2301/4471; B65H 2301/44712
See application file for complete search history.

(56) References Cited

U.S. PATENT DOCUMENTS

| | | | |
|---|---|---|---|
| 2004/0206254 | A1 | 10/2004 | Both et al. |
| 2013/0160663 | A1 | 6/2013 | Gaillande |

FOREIGN PATENT DOCUMENTS

| | | | | |
|---|---|---|---|---|
| EP | 0739722 | A1 | 10/1996 | |
| EP | 1647376 | A1 * | 4/2006 | ............ B26D 7/015 |
| JP | H08300604 | A | 11/1996 | |
| JP | 2004098687 | A | 4/2004 | |
| JP | 2004-314175 | A | 11/2004 | |
| JP | 4664583 | B2 | 4/2011 | |
| JP | 2013-542866 | A | 11/2013 | |
| KR | 1020040090729 | A | 10/2004 | |
| KR | 1020130064112 | A | 6/2013 | |
| RU | 2684320 | C1 | 4/2019 | |
| TW | 193960 | | 11/1992 | |
| TW | 201219229 | A | 5/2012 | |
| WO | 2012034645 | A1 | 3/2012 | |
| WO | WO 2016/189515 | A1 | 12/2016 | |

* cited by examiner

HOT FOIL STAMPING PRESS WITH A FLOW GUIDING ELEMENT

CROSS-REFERENCE TO RELATED APPLICATION(S)

This application is a National Stage under 35 U.S.C. § 371 of International Application No. PCT/EP2020/025142, filed Mar. 24, 2020, which claims priority to European Patent Application No. 19020262.2, filed Apr. 5, 2019, the contents of all of which are incorporated by reference in their entirety.

The invention relates to a hot foil stamping press.

Hot foil stamping is a method for transferring patterns and texts from a foil onto a sheet at high temperatures. The sheet can be cardboard or paper, and the foil is either a metallized plastic foil or a thin metal foil. Typically, the foil is pressed onto the surface of the sheet so that part of the foil is transferred to the sheet where it adheres.

After the hot foil stamping process, i.e. after part of the foil adheres to the sheet, the remaining foil has to be separated from the surface of the sheet. In order to support this process, blow devices are known which direct a gas between the foil and the sheet.

It is the object of the present invention to provide a hot foil stamping press with an improved efficiency for the separation process of the foil from the sheet.

In order to solve this object, the invention provides a hot foil stamping press comprising a pressing system for pressing a foil onto a sheet, a blow unit which is positioned at a distance to the pressing system for directing a stream of gas between the sheet and the foil, a gripper bar which is arranged between the blow unit and the pressing system for gripping and transporting the sheet, and a flow guiding element which is arranged between the blow unit and the pressing system for directing the gas from the blow unit between the sheet and the foil.

The invention is based on the basic idea to install a flow guiding element between the blow unit and the pressing system for guiding the gas from the blow unit to the gap between the sheet and the foil. Thereby, the gas losses are reduced such that less gas has to be provided for the separation process of the foil from the sheet. Furthermore, the separation process itself is improved through the more efficient gas flow resulting in an improved quality of the separation process leading to a gain in the quality of the production from the hot foil stamping press. Lastly, the speed possible of the separation process is increased when applying the same amount of gas resulting. Therefore, the invention provides a more efficient hot foil stamping press.

In one embodiment of the invention, the flow guiding element covers the area between the blow unit and the pressing system at least partially. This reduces the amount of gas not reaching the gap between the foil and the sheet.

In other words, a surface on which the gas can flow along is provided by the flow guiding element directing the flow of gas.

Advantageously, the flow guiding element is void of any holes or apertures that would impair the efficiency of the flow of gas along an area covering the width of the sheet. To be useful the flow of gas is directed between the sheet and the foil. The efficiency is impaired if a hole of aperture captures a non-negligible portion of the flow and directs it somewhere else. Said width is measured in a direction transverse to a feeding direction F of the sheets.

To provide an easily adjustable flow guiding element, the flow guiding element may be a thin metal plate. It may also be a plate made of composite material like carbon or made of plastic. Thus, the gas flow direction can be adjusted by bending the thin plate according to the requirements.

Advantageously, the gripper bar may have a body and the flow guiding element may be an extension of a surface of the body facing the stream of gas of the blow unit. This enables an integration of the flow guiding element into existing components of the hot foil stamping press.

In one embodiment of the invention, the flow guiding element may be attached to the gripper bar and may cover the area between the gripper bar and the pressing system at least partially. Thereby, a cost-efficient mounting of the flow guiding element at the gripper bar is provided.

In order to provide a robust mounting, that the flow guiding element may have a convex or a concave portion with which the plate is attached to the gripper bar in a form-fitting concave or convex portion of the gripper bar.

The flow guiding element may have at least two convex and/or concave portions with which the flow guiding element is attached to the gripper bar in form fitting concave and/or convex portions of the body of the gripper bar. Thereby, the amount of gas not assisting the separation process of the foil from the sheet is reduced further.

In one embodiment of the invention, the gripper bar may have a gripping arm extending from the side of the gripper bar facing the pressing system and the flow guiding element may be attached to a part of the gripping arm. This allows for an efficient guiding of the gas since the flow guiding element is mounted close to the gap between the sheet and foil.

The gripping arm may have an upper part and a lower part which are pivotable relative to each other about a pivot axis, wherein the flow guiding element is attached to the upper or lower part of the gripping arm. Thereby, the flow guiding element does not interfere the gripping of the sheet after the separation of the foil from the sheet.

In one embodiment of the invention, the gripper bar may have at least two gripping arms extending from the side of the gripper bar facing the pressing system and the flow guiding element may be attached to a part of each gripping arm. The fixation of the flow guiding element at multiple fixation points allows for a fine tuning of the alignment of the flow guiding element.

The flow guiding element may reduce the amount of gas streaming between the gripping arms of the gripper bar. Hence, less gas is needed for the separation of the sheet from the foil and, therefore, a more efficient hot foil stamping press is provided.

The pressing system preferably comprises a platen system.

Figure 2:
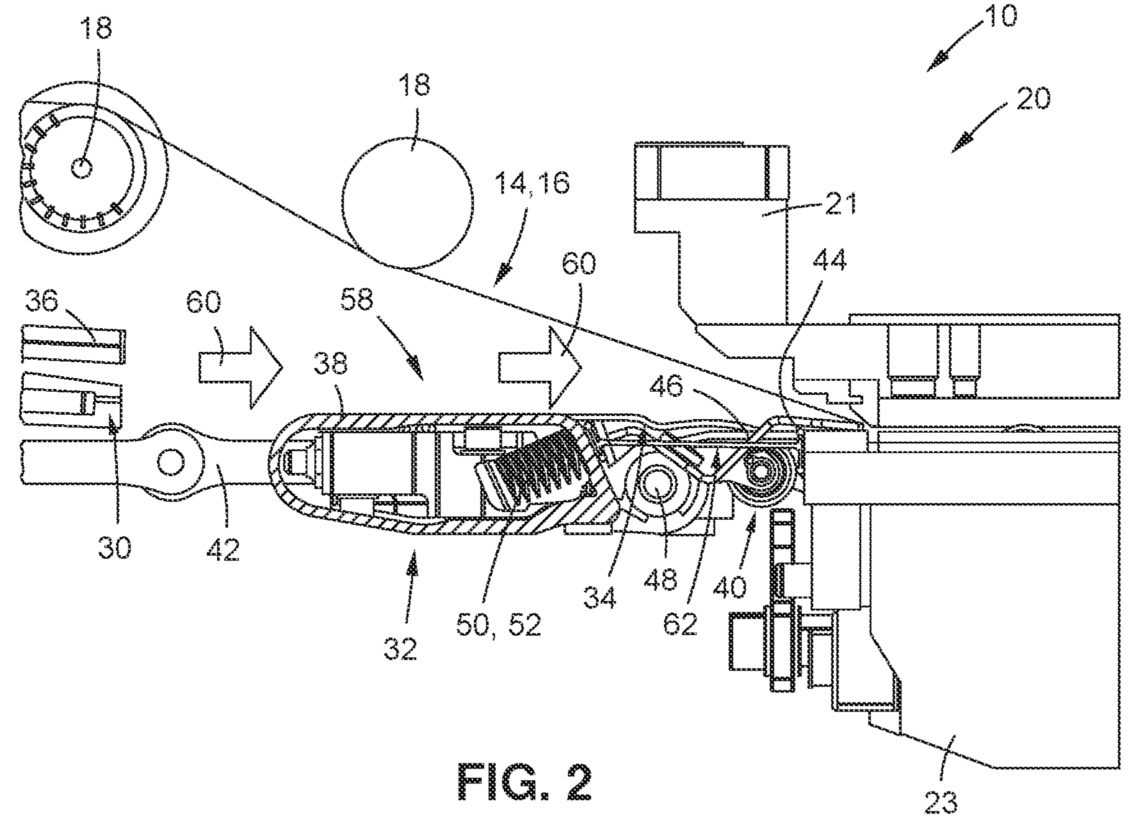
Figure 3:
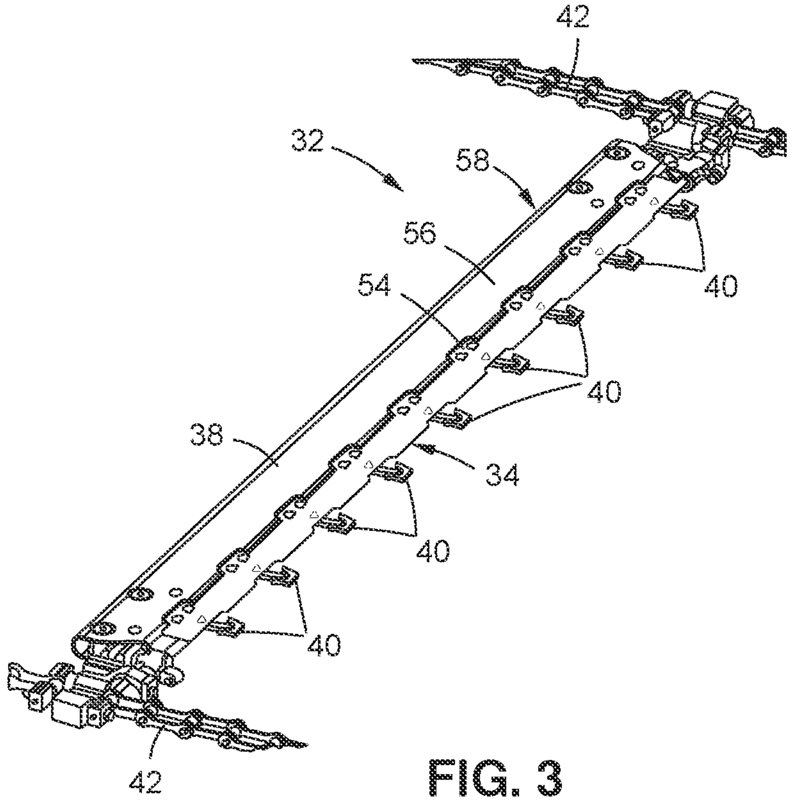

Further features and advantages of the invention will be apparent from the following description of one embodiment of the present invention with the aid of the enclosed drawings, in which:

FIG. 1 is a schematic side view of a hot foil stamping press with a blow device, FIG. 2 is a schematic side view of the back side of the hot foil stamping press of FIG. 1, and FIG. 3 shows a perspective view of a gripper bar of the FIGS. 1 and 2.

In FIG. 1, the essential parts of a hot foil stamping press 10 are shown. It comprises a pressing table 11 on which a sheet, in particular consisting of paper or cardboard, can be advanced along a feeding direction F.

A schematically shown holder 12 is provided for holding a supply 13 of foil 14. Supply 13 can be in the form or a roll or bobbin on which foil 14 is wound.

In the embodiment of hot foil stamping press 10 of FIG. 1, supply 13 is arranged on a front side of the machine. The front side of the machine is the side where the control elements used for adjusting the settings of the machine are arranged.

In principle, supply 13 may be arranged at the backside of hot foil stamping press 10 as well.

The foil 14 is a thin foil from plastic which has been metallized, or a thin metal foil. With the hot foil stamping press, certain portions of the foil are applied to the sheet.

As can be seen in FIG. 1, a second foil 16 can also be supplied.

Foil 14 is guided over the sheet by means of a guiding system comprising a plurality of rollers 18.

For pressing foil 14 onto the sheet and for making part of foil 14 adhere to the sheet, a pressing system 20 is provided by a fixed upper beam 21, a moveable lower beam 23, and pressing table 11 as shown in FIG. 1.

Pressing system 20 comprises a platen press.

On the backside of the machine, a discarding system 22 for the used foil and a tensioning system 24 is arranged.

Discarding system 22 here comprises a plurality of brushes 28 which cooperate so as to exert a traction force on the used foil.

In general, discarding system 22 may comprise a vacuum system.

Tensioning system 24 has a tension shaft 25 and a pressing roller 26. Tension shaft 25 is turning at a constant speed generating a traction force on the used foil. Pressing roller 26 presses the used foil against tension shaft 25 such that tension shaft 25 can exert a constant traction force on foil 14.

Thus tensioning system 24 keeps foil 14 straight in pressing system 20.

Additionally a blow unit 30, a gripper bar 32, and a flow guiding element 34 are arranged on the backside of the machine. These components are shown in greater detail in FIG. 2 which is a side view of the backside of the hot foil stamping press 10.

Blow unit 30 has a plurality of nozzles 36 directing a stream of gas into the gap between the sheet and the foil. It assists the process of separating foil 14 from the sheet.

Gripper bar 32 is arranged between blow unit 30 and pressing system 20.

As shown in the perspective view of FIG. 3, the gripper bar has a body 38 and a plurality of gripping arms 40 extending from the side of body 38 facing pressing system 20.

Body 38 forms the support structure of gripper bar 32 and is attached to a transporting chain 42 at each end of body 38 enabling a movement of the gripper bar 32 through the movement of transporting chain 42.

Gripping arms 40 have an upper part 44 and a lower part 46 each, upper part 44 and lower part 46 being pivotable relative to each other about a pivot axis 48.

More specifically, upper part 44 and lower part 46 are pivotable such that a gap can form between upper part 44 and lower part 46 into which the sheet can be trapped. To form the gap, a pivoting mechanism 50 is provided.

In FIG. 2, pivoting mechanism 50 comprises a spring 52.

Hence, gripper bar 32 is adapted to grab the sheet from pressing table 11 and to take it away from pressing table 11.

Flow guiding element 34 is a thin plate and arranged between blow unit 30 and pressing system 20.

Please note that the guiding element 34 has no holes nor any aperture of a size that could impair its flow guiding capabilities along its width. In other words, there is no hole of aperture on the area that corresponds to the width of the sheet, and thus that corresponds to the width of the area where the foil 14 may be stamped on the sheet.

More specifically, flow guiding element 34 is mounted at gripper bar 32 in a form fitting manner. For this purpose, flow guiding element 34 has convex portions 54 which are fitted into concave portions 56 of body 38.

As shown in FIGS. 2 and 3, flow guiding element 34 is mounted at gripper bar 32 and attached to lower part 46 of each gripping arm 40 such that it is an extension of an upper surface 58 of body 38 facing the stream of gas 60 from blow unit 30.

Flow guiding element 34 is adapted to direct gas 60, which is illustrated by the large arrows, injected from blow unit 30 in between the sheet and foil 14. Thereby, it assists the separation process of foil 14 from the sheet.

More specifically, flow guiding element 34 reduces the amount of gas 60 not hitting the gap between foil 14 and the sheet by covering area 62 between blow unit 30 and pressing system 20 partially.

In particular, flow guiding element 34 covers area 62 between gripper bar 32 and pressing system 20 as well as the area between gripping arms 40 (FIG. 3). Flow guiding element 34, therefore, reduces gas 60 streaming in between gripping arms 40 and not hitting the gap between foil 14 and the sheet.

Gas 60 may be air.

In the embodiment shown in the FIGS. 1 to 3, gripper bar 32 has a plurality of gripping arms 40. In principle, however, it is conceivable that the gripper bar 32 has only one gripping arm 40.

Furthermore, the arrangement of concave portions 56 and convex portions 54 can be exchanged and concave portions 56 can be provided at flow guiding element 34 and convex portions 54 at gripper bar 32.

In principle, flow guiding element 34 may be attached to gripper bar 32 with one concave portion 56 and one convex portion 54 only.

The invention claimed is:

1. A hot foil stamping press comprising:

a pressing system for pressing a foil onto a sheet;

a blow unit which is positioned at a distance from the pressing system for directing a stream of gas between the sheet and the foil;

a gripper bar which is arranged between the blow unit and the pressing system for gripping and transporting the sheet; and a flow guiding element which is arranged between the blow unit and the pressing system for directing the gas from the blow unit between the sheet and the foil, wherein the flow guiding element is a thin plate.

2. The hot foil stamping press of claim 1, wherein the flow guiding element covers an area between the blow unit and the pressing system at least partially.

3. The hot foil stamping press of claim 1, wherein the flow guiding element is void of any hole or aperture along an area covering a width of the sheet, wherein the width of the sheet is measured along a direction transverse to a direction of transport of the sheet.

4. The hot foil stamping press of claim 1, wherein the gripper bar has a body and the flow guiding element is an extension of a surface of the body facing the stream of gas of the blow unit.

5. The hot foil stamping press of claim 1, wherein the flow guiding element is attached to the gripper bar and covers an area between the gripper bar and the pressing system at least partially.

6. The hot foil stamping press of claim 5, wherein the flow guiding element has a convex portion or a concave portion with which the flow guiding element is attached to the gripper bar in a form fitting concave portion or convex portion of the gripper bar.

7. The hot foil stamping press of claim 6, wherein the flow guiding element has at least two convex portions and/or concave portions with which the flow guiding element is attached to the gripper bar in form fitting concave portions and/or convex portions of a body of the gripper bar.

8. The hot foil stamping press of claim 1, wherein the gripper bar has a gripping arm extending from a side of the gripper bar facing the pressing system and the flow guiding element is attached to a part of the gripping arm.

9. The hot foil stamping press of claim 8, wherein the gripping arm has an upper part and a lower part which are pivotable relative to each other about a pivot axis, and wherein the flow guiding element is attached to the upper part or the lower part of the gripping arm.

10. The hot foil stamping press of claim 8, wherein the gripper bar has at least two gripping arms extending from the side of the gripper bar facing the pressing system and the flow guiding element is attached to a part of each gripping arm of the at least two gripping arms.

11. The hot foil stamping press of claim 10, wherein the flow guiding element reduces an amount of gas streaming between the at least two gripping arms of the gripper bar.

12. A hot foil stamping press comprising:

a pressing system for pressing a foil onto a sheet;

a blow unit which is positioned at a distance from the pressing system for directing a stream of gas between the sheet and the foil;

a gripper bar comprising one or more gripper arms, the gripper bar arranged between the blow unit and the pressing system for gripping and transporting the sheet with the gripper arms; and a flow guiding element which is arranged between the blow unit and the pressing system for directing the gas from the blow unit between the sheet and the foil, wherein the flow guiding element and the gripper arms are coextensive for at least a portion of a length of the gripper arms.

13. The hot foil stamping press of claim 12, wherein the gripper bar has a body, and the flow guiding element is an extension of a surface of the body facing the stream of gas of the blow unit.

14. The hot foil stamping press of claim 13, wherein an upper surface of the gripper bar extends over the flow guiding element.

15. A hot foil stamping press comprising:

a pressing system for pressing a foil onto a sheet;

a blow unit positioned to direct a stream of air between the sheet and the foil after the foil has been pressed onto the sheet;

a gripper bar between the blow unit and the pressing system for gripping and transporting the sheet; and a flow guiding element, distinct from the gripper bar, the flow guiding element providing a surface between the blow unit and the pressing system that prevents air from entering a space between a body of the gripper bar and the pressing system, wherein the gripper bar has a body, and the flow guiding element is an extension of a surface of the body facing the stream of gas of the blow unit.

16. The hot foil stamping press of claim 15, wherein an upper surface of the gripper bar extends over the flow guiding element.

17. The hot foil stamping press of claim 16, wherein the gripper bar comprises a plurality of concave portions, the flow guiding element comprises a plurality of convex portions along a width of the gripper bar, and a lateral position of each of the plurality of concave portions of the gripper bar and a lateral position of each of the plurality of convex portions of the flow guiding element correspond to a lateral position of a gripping arm of the gripper bar.

18. The hot foil stamping press of claim 17, wherein the gripper bar includes at least five gripping arms.

19. The hot foil stamping press of claim 18, wherein the gripper bar incudes nine gripping arms.

20. The hot foil stamping press of claim 16, wherein the flow guiding element comprises no apertures having a width of an area where foil is stamped on the sheet.

* * * * *